G. P. CARROLL.
PRESSURE AND ELECTRIC CONDENSER VALVE.
APPLICATION FILED MAY 4, 1907.

1,045,121. Patented Nov. 26, 1912.

Witnesses:
A. M. Kimber.
Elizabeth Leonard.

Inventor
George P. Carroll

UNITED STATES PATENT OFFICE.

GEORGE P. CARROLL, OF BRIDGEPORT, CONNECTICUT.

PRESSURE AND ELECTRIC CONDENSER-VALVE.

1,045,121.  Specification of Letters Patent.  Patented Nov. 26, 1912.

Application filed May 4, 1907. Serial No. 371,822.

*To all whom it may concern:*

Be it known that I, GEORGE P. CARROLL, a citizen of the United States, residing at Bridgeport, in the county of Fairfield and State of Connecticut, have invented a new and useful Pressure and Electric Condenser-Valve, of which the following is a specification.

My invention relates in general to improvements in valves which remain closed until the pressure of fluid in a fluid system reaches or exceeds a predetermined limit and which thereafter remains open only until power is applied to close the same.

It especially relates to condenser valves in refrigerating systems, whether of the absorption or compression type.

The means employed consist of means whereby the pressure of the high tension gas compressed by the compressor or expelled from the still, as the case may be, is operative to open the valve by its action upon a diaphragm, of means whereby power is applied to close and lock the valve simultaneously with stopping of the compressor- or with the turning off of heat from the still then in use as such, as the case may be, and of means for unlocking the valve when the compressor is again to be started or a still again is about to be heated, as the case may be.

Figure 1:
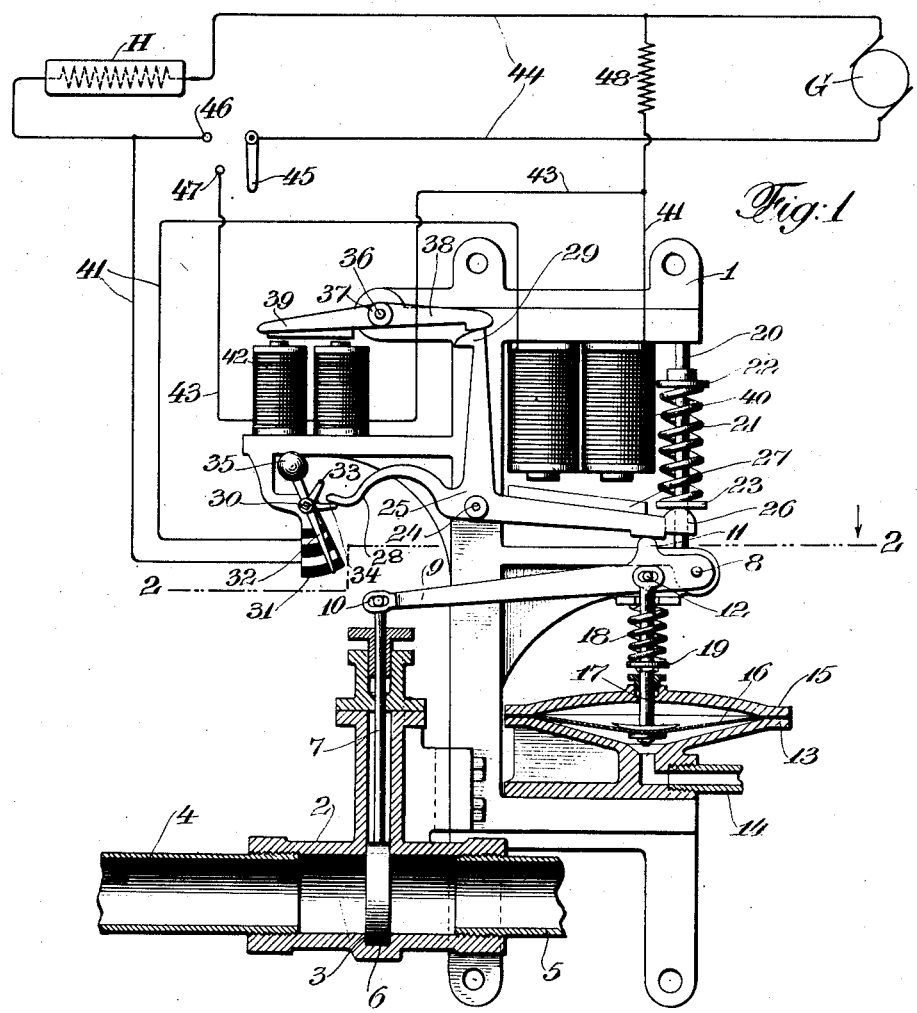
Figure 2:
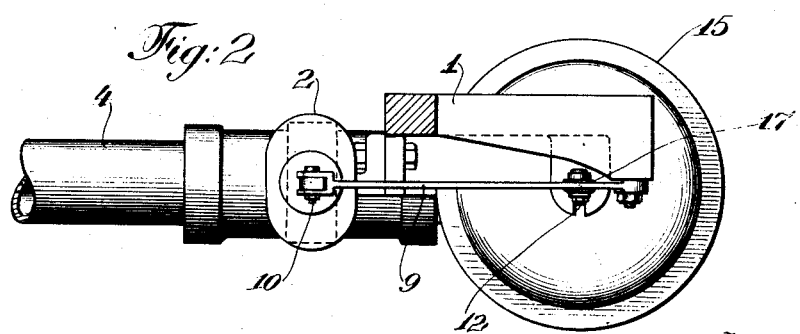

In the drawings Figure 1 is a partial vertical section and a partial elevation of the valve structure and its diagrammatic connections, and Fig. 2 is a partial cross section and a partial plan view of the same along the line 2—2 as seen from above.

A frame 1, attachable through screw or bolt holes to a vertical surface, has bolted or otherwise attached to it a valve casing 2, having near its center a vertical valve seat 3 and adapted for the reception into its ends of an inlet pipe 4 and an outlet pipe 5 for the transmission of cooling water to the condenser of a refrigerating system. Adapted to occupy the valve seat 3 is a valve 6, say of the gate valve type, having a stem 7 extending up through a suitable stuffing box and gland bolted or otherwise secured to the top of the casing. Pivoted to the frame 1 at 8 is one end of a horizontal lever 9, having its other end forked and horizontally slotted for the reception of a pin 10 passed through a head at the upper end of the stem 7 and through the slot in each fork. On the upper side of the lever not far from the pivot 8 is a projection 11 and beneath it extending horizontally frontward is an opening for the passage of a pin 12.

Attached to or cast as one piece with the frame 1 is a flanged lower casing 13 having a passage into which is connected a pipe 14, intended for connection with the high pressure side of a refrigerating system, either of the compression or of the absorption type. The part of the condenser above referred to, containing the compressed gas, is normally a part of such high pressure side and is connected with the pipe 14. Superimposed upon the lower casing is a flanged upper casing 15 so as to inclose between the two flanges and to hold by bolts or otherwise a diaphragm 16. This diaphragm is so flexible or resilient that at the center it can be moved up or down while the periphery remains stationary. Passing centrally through the upper casing 15, where it is provided with a suitable stuffing box and gland, is a stem 17, passing near its lower end through the center of the diaphragm where it is provided with suitable washers on both sides of the diaphragm and a lock nut for distributing the push or pull on the diaphragm and for holding the stem in place; the stem is also forked and horizontally slotted at its top for the passage of the pin 12. A coiled spring 18 surrounds the stem 17 and abuts at its top against a part of the frame 1 and at its bottom against the upper side of a disk and lock nut 19 adapted for longitudinal adjustment on the stem 17.

A vertical rod 20 is inserted top and bottom into separate parts of the frame 1 and is surrounded by a coiled spring 21, stronger than the coiled spring 18. The coiled spring 21 abuts at its top against a disk and lock nut 22 longitudinally adjustable on the rod 20 and at its bottom against a disk 23, free to move up or down on the rod. Pivoted to the frame 1 at 24 is a three-part lever 25. Extending longitudinally from the pivot is a main arm 26 having an eye at its outer extremity through which the rod 20 is inserted so as to bring the disk 23 above the extremity of the arm. The parts are so located that a lower face on the main arm near its outer extremity is adapted to rest on top of the projection 11. The upper side of the main arm is provided with an armature 27. From the pivot 24 a short arm 28 extends horizontally in a direction opposite to that of the main arm 26 and an upper arm 29 extends upward, ending in a sloping face.

Pivoted at 30 to a properly insulated extension 31 of the frame 1 is a switch 32, having two limit arms 33 and 34 extending to the right and adapted to make contact in alternation with the outer end of the short arm 28. Extending upward from the pivot 30 in an opposite direction from the switch 32 is a weight arm ending in a small globular weight 35. Pivoted at 36 on the frame 1 is a two-arm lever 37 having a right arm 38 with a tooth at its outer end adapted to engage with the upper arm 29 so as to lock the same or so as to rest on its sloping face when the upper arm is unlocked. Extending horizontally from the pivot 36 in a direction opposite to that of the right arm is a left arm 39, having an armature on its under side.

Secured to the frame 1 and depending therefrom so as to be immediately over the armature 27 is an electro-magnet 40. A line 41 connects the extension 31 and the switch 32 to the electro-magnet 40. Resting on a projection of the frame 1 and immediately under the armature of the left arm 37 is an electro-magnet 42, to and from which leads a line 43.

An electric generator G, as at a central power station, has mains 44 leading to and through a heater H. A switch 45 is adapted to open and close the circuit between the generator and the heater by making contact at 46, and between its contact at 46 and its open position as shown it makes an intermediate contact at 47. The line 41 is connected at one end with the mains 44 between the contact point 46 and the heater H and after passing through a resistance 48 it connects at its other end to the mains between the heater and the generator. The line 43 connects at one end with the contact point 47 and at its other end with the line 41 between the electro-magnet 40 and the resistance 48.

The method of operation is as follows: When a slight current passes through the line 41 and the switch 32, the electro-magnet 40 is energized and the several arms of the three-part lever 25 are rotated counter-clockwise. Consequently the tooth at the end of the right arm 38 engages and locks the upper arm 29; the main arm 26 is raised from off the projection 11 and as it raises the free disk 23 it compresses the coiled spring 21; and the short arm 28 thrusts downward the limit arm 34 and brings the weight 35 to the right of the vertical axis of the pivot 30. When the weight so gets past the vertical axis of the pivot it falls still farther until the limit arm 33 engages the short arm 28 and the switch 32 is rotated so far to the left that the switch is opened and the current is broken. This breaking of current does not occur until the upper arm 29 has been locked. The elevation of the main arm 26 from off the projection 11 permits the lever 9 to be acted upon by other forces. The coiled spring 18 still is operative to force the disk and lock nut 19 downward and consequently keeps depressed the stem 17, the diaphragm 16, the lever 9, the stem 7 and the valve 6. But as high pressure gas passes through the pipe 14 into the lower casing 13, as happens when the connected compressor or still has fairly begun to work, it tends to force the diaphragm 16 upward. When the tension of the gas gets strong enough, it overcomes the thrust of the spring 18 on the disk and lock nut 19 and the weight of the connected parts; and thus it lifts the diaphragm 16, the stem 17, the lever 9, the stem 7 and the valve 6 from off its seat 3. The extent to which the valve can be opened is regulated by the proper adjustment of the disk and lock nut 19 and is proportionate to the pressure of the gas on the under side of the diaphragm. When a refrigerating system begins to operate, especially when heat is first applied to the still of an absorption system, the condenser pressure may not rise immediately to any considerably extent. Consequently there is no need of condensing water until the head pressure reaches say 160 lbs. in an ammonia system. Therefore the coiled spring 18 and the disk and lock nut 19 may be so regulated that the valve will not open until some such pressure is indicated by the high pressure gage. And if the pressure increases, it proportionately overcomes the increasing resistance of the coiled spring 18 and thus opens the valve still more according to the requirements of the system.

When it is desired to close the valve a slight current is sent through the line 43 and the electro-magnet 42 is thereby energized so as to depress the left arm 39 and to raise and unlock the tooth of the right arm 38 from the upper arm 29. The coiled spring 21 now becomes operative to depress the disk 23 and to rotate clockwise the several arms of the three-part lever 25. Consequently the short arm 28 thrusts upward the limit arm 33 and brings the weight 35 to the left of the vertical axis of the pivot 30. When the weight so gets past the vertical axis of the pivot it falls still farther until the limit arm 34 engages the short arm 28 and the switch 32 is rotated so far to the left as to close. In consequence of this last rotation the tooth of the right arm 38 rests on the sloping face of the upper arm 29 and the main arm 26 bears down upon the projection 11. Consequently the lever 9 and the stem 7 are depressed so as to force the valve 6 into its seat 3 and the stem 17 and the diaphragm 16 are also depressed notwithstanding the counter force of gas pressure on the under side of the diaphragm. For the coiled springs 21 and 19 are constructed of sufficient strength so that, with the assistance of the weight of their connected moving parts, they will overcome the maximum opposed pressure on the under side of the diaphragm.

With the diagrammatic connections as shown, by the closing of the switch 45 by making contact at 47, a current passes from the generator G through the mains 44 to the heater H and thence back to the generator at the same time that the electro-magnet 40 is energized. And by making a slight intermediate contact at 47 as the switch is being opened, an instantaneous current energizes the electro-magnet 42 as the current is turned off from the heater. The valve is thus unlocked so as to permit of its subsequent opening when the condenser pressure reaches a predetermined limit; and such unlocking occurs simultaneously with the turning on of power through the mains for some other purpose. And the valve is closed simultaneously with the shutting off of such power. The heater H is intended especially to be used to heat the still of an automatic absorption refrigerating system. In its place may be substituted a motor for the compressor of an automatic compression refrigerating system.

While the valve is especially adapted for use as a part of an electrically operated automatic system, it can also be used with any kind of motive power for a compressor or with any kind of heat for a still. For the valve may be operated electrically although the plant itself is not so operated.

There is one type of condenser valve having a diaphragm and so connected that when the head pressure reaches a predetermined limit, the gas from the condenser acts upon the diaphragm so as to overcome an opposed weight or spring and thus to open the valve; then when the pressure falls sufficiently the weight or spring overcomes the tension of the gas and closes the valve. Such an opening of necessity occurs after the compressor has been started or after the still has begun to be heated. And there is no waste of condensing water between the time of starting the plant and the time when the head pressure rises to a point indicative of the need of water. On the other hand, when such a plant is shut down, there is no longer any need of condensing water; both the hot gas and the heated water in the condenser might then be allowed to cool down to the temperature of the surrounding atmosphere. The use of any more condensing water is an absolute waste. In the type of valve referred to such a waste occurs of necessity between the time when the plant is shut down and the time when the pressure falls low enough to permit of the closing of the valve. But my invention, by closing the valve immediately on the stoppage of the plant, prevents any such waste. My valve also has the advantage that power is stored up by the compression of the coiled spring 21 for the subsequent closing of the valve at the very time when the plant is being started and when the motive power is of necessity adequate.

I claim:

1. In combination a condenser water pipe, a valve controlling said pipe, subordinate means adapted to permit of dense gas opening said valve, and superior means available either to prevent said subordinate means from permitting such gas to open said valve or to permit said subordinate means to permit such gas so to do.

2. In combination a valve, subordinate means adapted to permit of fluid under a predetermined pressure opening said valve, an adjusting device for predetermining the limit at which such pressure may open said valve, and superior means available either to absolutely prevent said subordinate means from permitting such fluid to open said valve or to permit said subordinate means to permit such fluid so to do on reaching such pressure limit.

3. In combination a chamber having a port, a valve adapted to open or to close said port, subordinate means adapted to permit of fluid under a predetermined pressure opening through said valve said port, an adjusting device for predetermining the limit at which such pressure may so open said port, and superior means available either to absolutely prevent said subordinate means from permitting such fluid to so open said port or to permit said subordinate means to permit said fluid so to do on reaching such pressure limit.

4. In combination a valve, subordinate means adapted to permit of fluid under a predetermined pressure opening said valve, an adjusting device for predetermining the limit at which such pressure may open said valve, superior means tending and initially operating to prevent said subordinate means from permitting such fluid to open said valve, and means for either permitting said superior means to act according to its tendency or for preventing it from so acting.

5. In combination a chamber having a port, a valve adapted to open or to close said port, subordinate means adapted to permit of fluid under a predetermined pressure opening through said valve said port, an adjusting device for predetermining the limit at which such pressure may so open said port, superior means tending and initially operating to prevent said subordinate means from permitting such fluid to so open said port, and means for either permitting said superior means to act according to its tendency or for preventing it from so acting.

6. In combination a valve, subordinate means adapted to permit of fluid under a predetermined pressure opening said valve, an adjusting device for predetermining the limit at which such pressure may open said valve, superior means tending and initially operating to prevent said subordinate means from permitting such fluid to open said valve, means for applying power to permit said superior means to act according to its tendency, and means for subsequently applying power to prevent said superior means from acting according to its tendency and for automatically shutting off such power.

7. In combination a chamber having a port, a valve adapted to open or to close said port, subordinate means adapted to permit of fluid under a predetermined pressure opening through said valve said port, an adjusting device for predetermining the limit at which such pressure may so open said port, superior means tending and initially operating to prevent said subordinate means from permitting such fluid to so open said port, means for applying power to permit said superior means to act according to its tendency, and means for subsequently applying power to prevent said superior means from acting according to its tendency and for automatically shutting off such power.

8. In combination a valve, a chamber having a wall tending to move outward upon the application of fluid pressure from within, a connection between said valve and said wall whereby an outward movement of said wall opens said valve, exterior means tending and initially operating to prevent said wall from moving outward, means for applying power to permit said exterior means to act according to its tendency, and means for subsequently applying power to prevent said exterior means from acting according to its tendency and for automatically shutting off such power.

9. In combination a valve, a chamber having a wall tending to move outward upon the application of a predetermined fluid pressure from within, a connection between said valve and said wall whereby an outward movement of said wall opens said valve, exterior means tending and initially operating to prevent said wall from moving outward, means for applying power to permit said exterior means to act according to its tendency, and means for subsequently applying power to prevent said exterior means from acting according to its tendency and for automatically shutting off such power.

10. In combination a valve, a chamber having a wall tending to move outward upon the application of fluid pressure from within, a connection between said valve and said wall whereby an outward movement of said wall opens said valve, a device for keeping said wall unmoved up to a predetermined pressure of such fluid, exterior means tending and initially operating to prevent said wall from moving outward, means for applying power to permit said exterior means to act according to its tendency, and means for subsequently applying power to prevent said exterior means from acting according to its tendency and for automatically shutting off such power.

11. In combination a valve, subordinate means adapted to permit of fluid under a predetermined pressure opening said valve, an adjusting device for predetermining the limit at which such pressure may open said valve, superior means tending and initially operating to prevent said subordinate means from permitting such fluid to open said valve, means for applying electric power to permit said superior means to act according to its tendency, and means for subsequently applying electric power to prevent said superior means from acting according to its tendency and for automatically shutting off such power 12. In combination a condenser water pipe, a valve controlling said pipe, subordinate means adapted to permit of fluid under a predetermined pressure opening said valve, an adjusting device for predetermining the limit at which such pressure may so open said valve, superior means tending and normally operative to prevent said subordinate means from permitting such fluid to so open said valve, means for applying electric power to permit said superior means to act according to its tendency, and means for subsequently applying electric power to prevent said superior means from acting according to its tendency and for automatically shutting off such power.

13. In combination a water valve, a locking device positionable first so as to close said valve and secondly so as to permit of its being opened, means for locking said device in the second position, means operated by fluid pressure for opening said valve, and means for subsequently unlocking said device and positioning it in its first position.

14. In combination a water valve, a locking device positionable first so as to close said valve and secondly so as to permit of its being opened, electrically controlled means for locking said device in its second position, means operated by fluid pressure for opening said valve, and means for subsequently unlocking said device and positioning it in its first position.

15. In combination a water valve, a locking device positionable first so as to close said valve and secondly so as to permit of its being opened, means for locking said device in its second position, means operated by fluid pressure for opening said valve, and electrically controlled means for subsequently unlocking said device and positioning it in its first position.

16. In combination a water valve, a locking device positionable first so as to close said valve and secondly so as to permit of its being opened, electrically controlled means for locking said device in its second position, means operated by fluid pressure for opening said valve, and electrically controlled means for subsequently unlocking said device and positioning it in its first position.

17. In combination a water valve, a locking device positionable first so as to close said valve and secondly so as to compress the hereinafter mentioned spring and to permit of said valve being opened, a spring operative after having been so compressed and when said device is unlocked as hereinafter stated to position said device in its first position, means for locking said device in its second position, means operated by fluid pressure for opening said valve, and means for subsequently unlocking said device.

18. In combination a water valve, a locking device positionable first so as to close said valve and secondly so as to compress the hereinafter mentioned spring and to permit of said valve being opened, a spring operative after having been so compressed and when said device is unlocked as hereinafter stated to position said device in its second position, electrically controlled means for locking said device in its second position, means operated by fluid pressure for opening said valve, and means for subsequently unlocking said device.

19. In combination a water valve, a locking device positionable first so as to close said valve and secondly so as to compress the hereinafter mentioned spring and to permit of said valve being opened, a spring operative after having been so compressed and when said device is unlocked as hereinafter stated to position said device in its first position, means for locking said device in its second position, means operated by fluid pressure for opening said valve, and electrically controlled means for subsequently unlocking said device.

20. In combination a water valve, a locking device positionable first so as to close said valve and secondly so as to compress the hereinafter mentioned spring and to permit of said valve being opened, a spring operative after having been so compressed and when said device is unlocked as hereinafter stated to position said device in its first position, electrically controlled means for locking said device in its second position, means operated by fluid pressure for opening said valve, and electrically controlled means for subsequently unlocking said device.

21. In combination a chamber having a port, a valve positionable so as to open or close said port, a first lever connected to said valve and positionable first so as to close said port through its valve and secondly so as to open it, a diaphragm connected to said first lever, a lockable lever operative when depressed to position said first lever in its first position and when lifted to compress the hereinafter mentioned spring, a spring operative after having been so compressed and when said lockable lever is unlocked to depress the same, means for locking said lockable lever in its lifted position, a casing connected for the admission of fluid under pressure to said diaphragm so as to position said first lever in its second position after said lockable lever has been so locked, and means subsequently operative to unlock said lockable lever.

22. In combination a chamber having a port, a valve positionable so as to open or close said port, a first lever connected to said valve and positionable first so as to close said port through its valve and secondly so as to open it, a diaphragm connected to said first lever, a lockable lever operative when depressed to position said first lever in its first position and when lifted to compress the hereinafter mentioned spring, a spring operative after having been so compressed and when said lockable lever is unlocked to depress the same, electrically actuated means for locking said lockable lever in its lifted position, a casing connected for the admission of fluid under pressure to said diaphragm so as to position said first lever in its second position after said lockable lever has been so locked, and means subsequently operative to unlock said lockable lever.

23. In combination a chamber having a port, a valve positionable so as to open or close said port, a first lever connected to said valve and positionable first so as to close said port through its valve and secondly so as to open it, a diaphragm connected to said first lever, a lockable lever operative when depressed to position said first lever in its first position and when lifted to compress the hereinafter mentioned spring, a spring operative after having been so compressed and when said lockable lever is unlocked to depress the same, means for locking said lockable lever in its lifted position, a casing connected for the admission of fluid under pressure to said diaphragm so as to position said first lever in its second position after said lockable lever has been so locked, and electrically actuated means subsequently operative to unlock said lockable lever.

24. In combination a chamber having a port, a valve positionable so as to open or close said port, a first lever connected to said valve and positionable first so as to close said port through its valve and secondly so as to open it, a diaphragm connected to said first lever, a lockable lever operative when depressed to position said first lever in its first position and when lifted to compress the hereinafter mentioned spring, a spring operative after having been so compressed and when said lockable lever is unlocked to depress the same, electrically actuated means for locking said lockable lever in its lifted position, a casing connected for the admission of fluid under pressure to said diaphragm so as to position said first lever in its second position after said lockable lever has been so locked, and electrically actuated means subsequently operative to unlock said lockable lever.

25. In combination a chamber having a port, a valve adapted to open or close said port, a lever 9 connected to said valve, a diaphragm 16 connected to said lever by a stem 17, a casing inclosing said diaphragm and adapted for the admission of fluid under pressure on its under side, a three-arm lever 25, a two-arm lever 37, a spring 21 tending to depress the arm 26 of said three-arm lever, electrical means for lifting the arm 26 so as to compress the spring 21 and to lock said three-arm lever with said two-arm lever, and electrical means subsequently operative to unlock said two-arm lever from such engagement.

26. In combination a chamber having a port, a valve positionable so as to open or close said port, a lever 9 connected to said valve, a diaphragm 16 connected to said lever by a stem 17, a casing inclosing said diaphragm and adapted for the admission of fluid under pressure on its under side, a three-arm lever 25, a two-arm lever 37, a spring 21 tending to depress the arm 26 of said three-arm lever, electrical means for lifting the arm 26 so as to compress the spring 21 and to lock said three-arm lever with said two-arm lever, automatic means for breaking the current that has actuated said electrical means, and electrical means subsequently operative to unlock said two-arm lever from such engagement.

27. In combination a heater, a chamber having a port, a valve positionable so as to open or close said port, a device positionable first so as to close said port through its valve and secondly so as to permit of its being opened, means for admitting fluid under pressure so as to open said port after said device is positioned in its second position, and other means for simultaneously starting the heating of said heater and positioning said device in its second position and for subsequently simultaneously turning off the heat from said heater and positioning said device in its first position.

28. In combination a heater, a chamber having a port, a valve positionable so as to open or close said port, a device positionable first so as to close said port through its valve and secondly so as to permit of its being opened, means for admitting fluid under pressure so as to open said port after said device is positioned in its second position, and electrically actuated means for simultaneously starting the heating of said heater and positioning said device in its second position and for subsequently simultaneously turning off the heat from said heater and positioning said device in its first position.

GEORGE P. CARROLL.

Witnesses:
  A. MAUDE KIMBER,
  LAURENCE J. GILL.